United States Patent [19]

Russell et al.

[11] Patent Number: 5,015,393
[45] Date of Patent: May 14, 1991

[54] AUTOMATICALLY ADJUSTABLE WEIR AND ENVIRONMENTALLY PROTECTED SENSOR FOR A FLOATING SLUDGE REMOVAL SYSTEM

[75] Inventors: Frederick E. Russell; Brandon Russell, both of Elgin, Ill.

[73] Assignee: Protectaire Systems Co., Elgin, Ill.

[21] Appl. No.: 384,555

[22] Filed: Jul. 24, 1989

Related U.S. Application Data

[63] Continuation of Ser. No. 891,139, Jul. 28, 1986, Pat. No. 4,867,872.

[51] Int. Cl.⁵ .............................................. B01D 21/24
[52] U.S. Cl. .................................. 210/744; 98/115.2;
118/603; 210/97; 210/143; 210/167; 210/525;
210/776; 210/805; 210/258
[58] Field of Search ........................ 73/293, 299, 302;
98/115.2; 210/101, 104, 525, 776, 803, 804, 248,
143, 86, 97, 258, 167, 195.1, 197, 744, 805;
118/326, 602, 603, 610

[56] References Cited

U.S. PATENT DOCUMENTS

| | | | |
|---|---|---|---|
| 2,633,989 | 4/1953 | Kelley et al. | 210/525 |
| 3,249,533 | 5/1966 | Fowler | 210/525 |
| 3,764,013 | 10/1973 | Eisenmann | 210/525 |
| 4,102,303 | 7/1978 | Corojer et al. | 118/326 |
| 4,154,678 | 5/1979 | Kole | 210/97 |
| 4,432,870 | 2/1984 | Russell | 98/115.2 |
| 4,545,295 | 10/1985 | Russell | 98/115.2 |
| 4,563,274 | 1/1986 | Rothon et al. | 210/101 |
| 4,585,557 | 4/1986 | Turnquist | 210/525 |
| 4,601,236 | 7/1986 | Napadow | 98/115.2 |
| 4,601,833 | 7/1986 | Shubert | 210/104 |
| 4,696,254 | 9/1987 | Spindler | 118/603 |
| 4,722,791 | 2/1988 | Turnquist | 210/525 |

FOREIGN PATENT DOCUMENTS 1233959 5/1986 U.S.S.R. .............................. 98/115.2
1576208 10/1980 United Kingdom ................. 73/302

Primary Examiner—Robert A. Dawson
Assistant Examiner—Joseph Drodge
Attorney, Agent, or Firm—Fitch, Even, Tabin & Flannery

[57] ABSTRACT

A liquid level sensor for occluded water is provided to detect the surface water level as in a spray booth tank. The water level sensor may control the water level in the tank or it may be used to maintain a relatively constant outflow of water from the tank through a vertically movable weir. The weir is moved in response to changes in the liquid level detected by the sensor which includes an electronic signal sensor capable of detecting a level of a liquid relative thereto. The sensor is mounted in an elongated housing that has its lower end disposed in the liquid in the reservoir. The upper end of the housing is vented to the atmosphere to equalize the pressure between the interior thereof and the atmosphere ambient the housing. A flexible diaphragm is secured to the housing so as to seal the open lower end, and a substantially pure test liquid is held within the housing isolated from the liquid in the reservoir. The flexible diaphragm constricts or expands in response to changing liquid levels in the reservoir so that the level of the test liquid stays substantially the same as that of the level of the liquid in the reservoir. The electronic sensor measures the position of the test liquid and sends an appropriate signal to a control system that actuates the weir to raise or lower it in response to changing liquid levels in the reservoir.

6 Claims, 4 Drawing Sheets

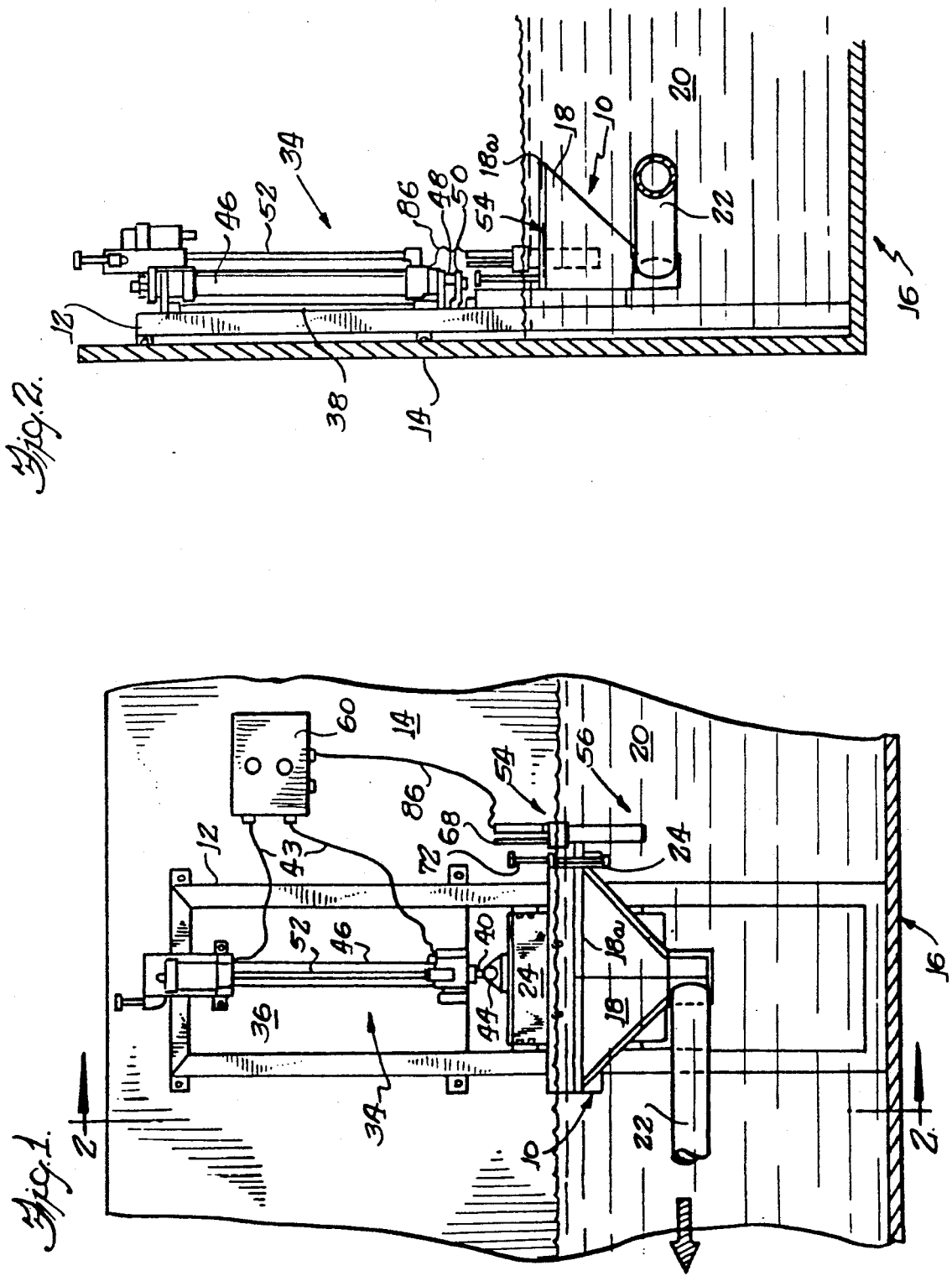

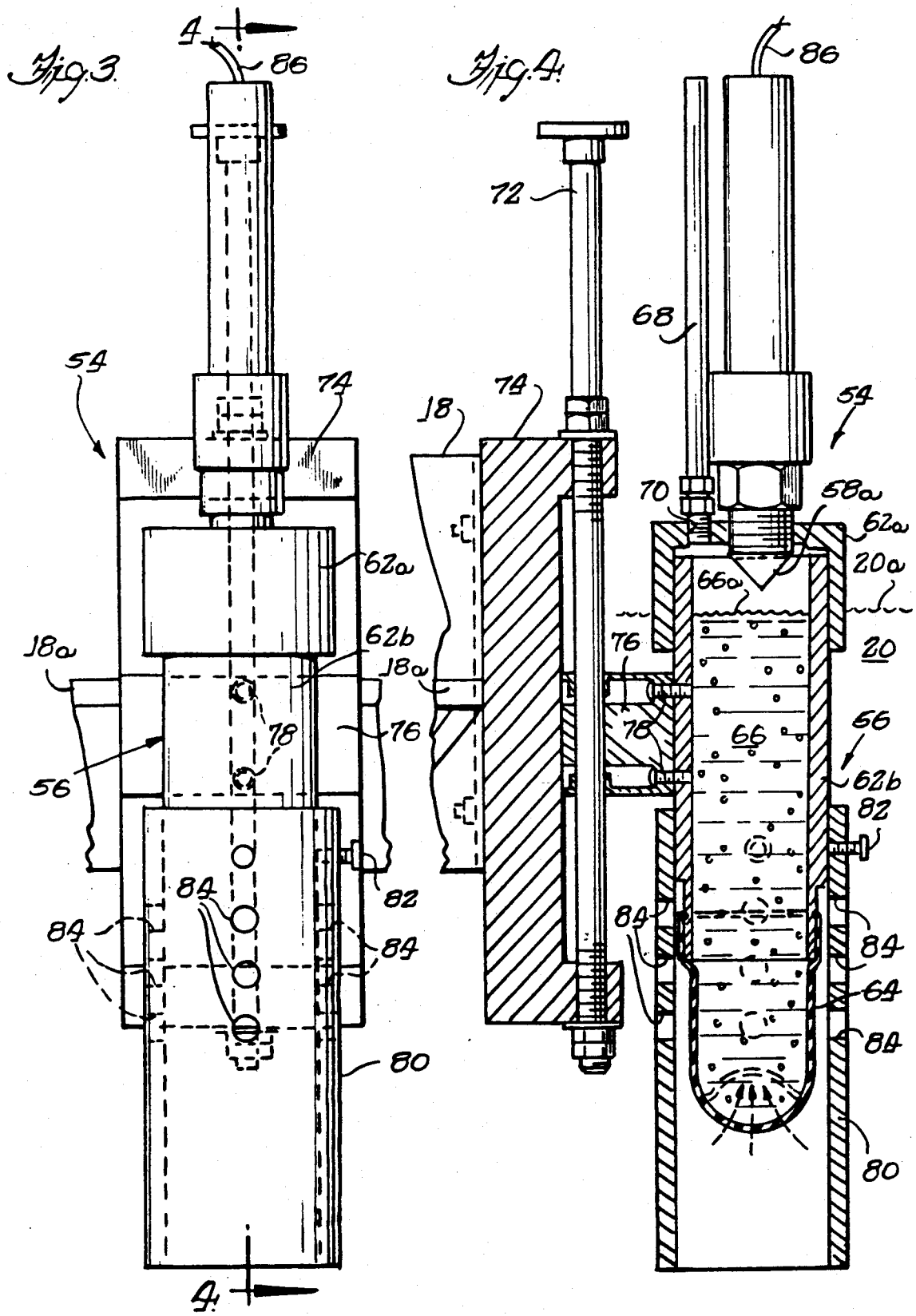

AUTOMATICALLY ADJUSTABLE WEIR AND ENVIRONMENTALLY PROTECTED SENSOR FOR A FLOATING SLUDGE REMOVAL SYSTEM

This is a continuation of application Ser. No. 05/891,139 Jul. 28, 1986 now U.S. Pat. No. 4,867,872.

The present invention relates to water treatment devices and, more particularly, to water level sensing and devices controlled thereby to handle contaminated water such as sludge-bearing water from a paint booth or the like.

Industrial spray finishing operations are often conducted in self-contained enclosures having systems for cleaning the air circulated therethrough of overspray particles. A preferred air cleaning system comprises a water wash in which the particulate-laden air is drawn through a falling or cascading water curtain so that the water droplets entrain the overspray particles. Such a system is disclosed in, e.g., U.S. Pat. No. 4,484,513, issued on Nov. 27, 1984, and U.S. Ser. No. 876,144 filed Jan. 3, 1986, which is incorporated herein by reference. In such a spray booth, the trapped overspray particles travel with the wash water to a holding tank or reservoir from which the water is recirculated to the water washes. Most holding tanks have chemicals added to the water for agglomerating the overspray particles to form a floating piece of sludge. The floating sludge and a top layer of water on which the sludge floats flow through a weir for removal from the holding tank and they are pumped to a remotely-located removal or separation unit which often has a skimming device for skimming the sludge from the water in a separation tank. The sludge is then processed to facilitate its recycling, disposal, etc.

In order to maintain a constant flow of sludge-laden water from the holding tank into the skimmer tank, the weir should be positioned adjacent to, but slightly below, the surface of the water in the holding tank. However, the water level in the holding tank varies during use due to, e.g., evaporation, and the water level changes most dramatically during the startup of the water wash, when the water level in the holding tank drops due to the filling of the previously-evacuated piping through which the water for the water wash is circulated or to coat flood sheets and to form air borne water washes in the spray booth. Such rapid or unusual fluctuation in the holding tank water level may interrupt the flow through the weir to the suction pump.

When using a sludge removal skimming apparatus such as, for example, disclosed in U.S. Pat. No. 4,432,870, a reciprocating carriage moves across the top of the water in the separation tank and a depending blade on the carriage skims off the floating sludge and pushes it up over a ramp to separate the sludge from the water which is then recirculated back to the spray booth for reuse in the water wash. The skimmer blade is most effective when it projects beneath the water surface a predetermined small distance e.g. one-eighth to one-fourth of an inch. If the water level in the separation tank becomes too low, then the skimmer blade is ineffective, in that it does not reach into the water. In automatically controlled apparatus, it is preferred that the skimming apparatus work effectively while unattended and that the system is capable of handling differences in water levels whether the water level differential is due to a startup or a loss of water from evaporation. While the main holding tanks often have water level controls to add new make-up water pipes for injecting fresh water into the system to compensate for water loss due to evaporation, or the like, such controls are not always effective and may not be responsive to correct for large sudden changes in water level which occur suddenly as when the empty pipes are filled with water at the start of the spray booth or at startup when the water level is lowered because a portion of the water is flowing as flood sheets and is suspended as a spray water wash.

In some instances, it is desired to control the outflow of water and sludge from a main collection tank to a separate sludge or occluded water tank, the skimmer blade being at the latter tank. In other instances, as in downdraft booths, the collected water and sludge are pumped directly from several booths to a common tank at which is located the skimmer blade. In either event, the water level for skimming is desired to be controlled.

Complicating the control of water level in sludge removal tanks is the fact that the sludge is a very sticky substance which quickly plates over and covers a level sensor with scum and sludge.

Although sensors are available to detect water levels, such as electrical sensors, float switches, optical probes, or sonic sensors, these generally will not work because the wash water in the reservoir is contaminated with the floating, agglomerated overspray particles, as well as foam and other flotsam. Such impurities or contaminants may coat the sensor or create a false surface higher than the water level to be gauged, thus making the sensor ineffective in accomplishing its purpose.

Accordingly, it is the principal object of the present invention to provide an improved system for maintaining a predetermined flow of liquid in response to changing water levels.

More particularly, it is an object to provide a liquid-level sensing device that operates accurately to detect the level of contaminant-laden water.

These objects, and others that will become apparent upon reference to the accompanying drawings and following detailed description are provided by a liquid level sensor to sense the level of occluded liquid such as sludge bearing water in a water reservoir of a spray booth tank. The liquid level sensor may be secured to a gravity feed inlet for a reservoir including an adjustable weir. The weir is moved in response to changes in the liquid level detected by the sensor which includes an electronic sensor capable of detecting a level of a liquid relative thereto. The sensor is mounted in an elongated housing that has its lower end disposed in the liquid in the reservoir. The upper end of the housing is vented to the atmosphere to equalize the pressure between the interior thereof and the atmosphere ambient the housing. A flexible diaphragm is secured to the housing so as to seal the open lower end, and a substantially pure test liquid is held within the housing isolated from the liquid in the reservoir. The flexible diaphragm constricts or expands in response to changing liquid levels in the reservoir so that the level of the test liquid stays substantially the same as that of the level of the liquid in the reservoir. The electronic sensor measures the position of the test liquid and sends an appropriate signal to a control system that actuates the weir to raise or lower it in response to changing liquid levels in the reservoir.

BRIEF DESCRIPTION OF THE FIGURES OF THE DRAWINGS

FIG. 1 is a front view of a gravity feed inlet for use in, e.g., the holding tank or reservoir of a water wash spray finish booth, the inlet being adapted to utilize the inventive device to automatically adjust the height of the inlet in response to changing water levels in the reservoir;

FIG. 2 is a side view of the device of FIG. 1;

FIG. 3 is an enlarged front view of the environmentally-protected water level sensor forming a part of the present invention;

FIG. 4 is a side view of the sensor of FIG. 3;

DETAILED DESCRIPTION OF THE PREFERRED EMBODIMENT

Figure 5:
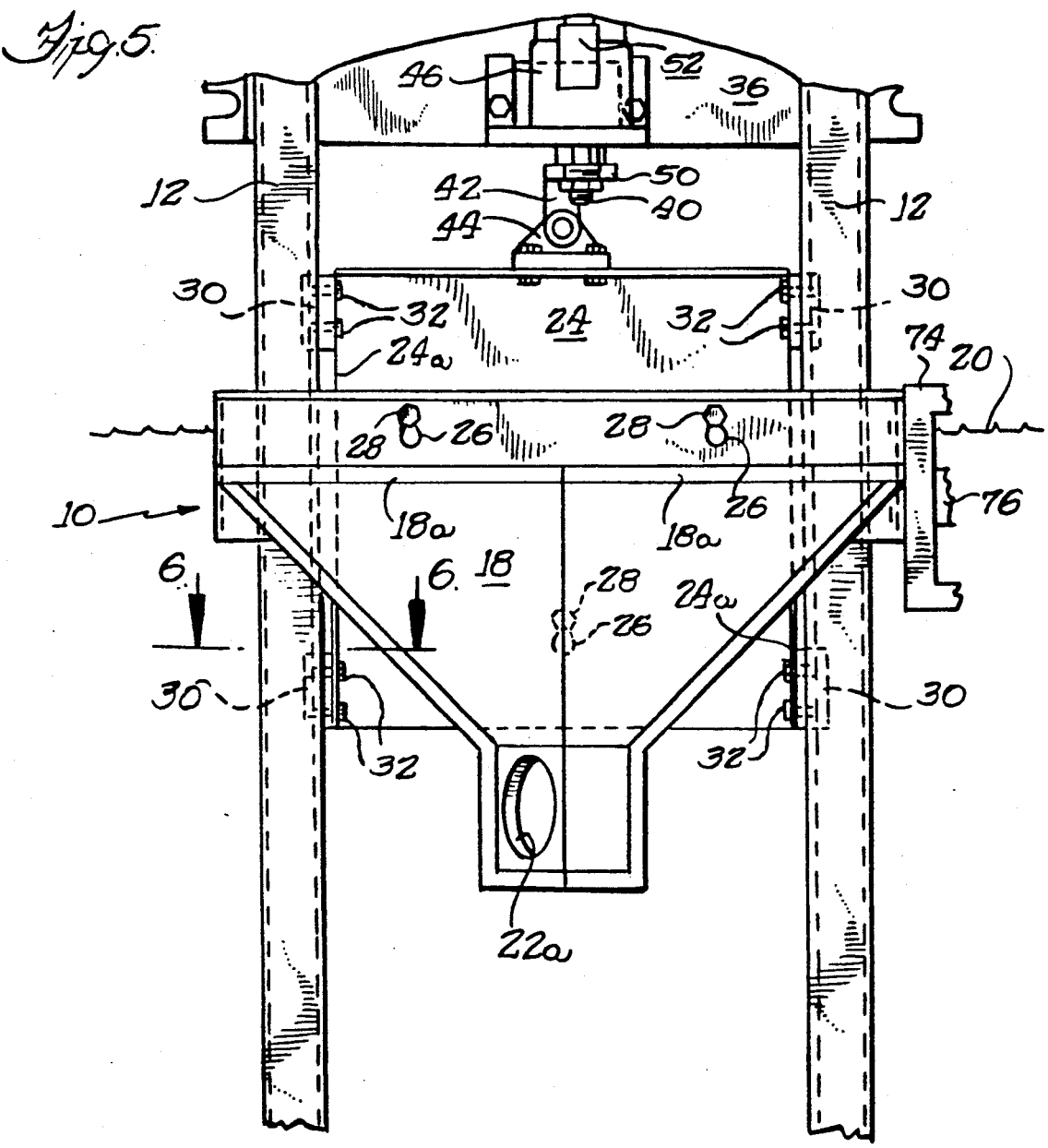
FIG. 5 is an enlarged, front view of the gravity feed inlet of FIG. 1.

Turning to the Figures of the drawings, which are by way of illustration and not limitation, there is seen in FIGS. 1 and 2 an automatic height-adjustable gravity feed inlet means, generally indicated by 10, that may be advantageously used in conjunction with, e.g., a water wash spray finishing booth. The gravity feed inlet means 10 is mounted on a frame or track 12 secured to one of the side walls 14 of a holding tank or reservoir generally indicated by 16. The gravity feed means 10 includes a weir 18 substantially in the form of an inverted pyramid. The weir 18 is disposed in the reservoir 16 so that its upper edges or lips 18a are located adjacent to, but slightly below, the surface of the water 20 in the reservoir 16 so that the water (and sludge or other flotsam on the surface thereof) flows into the weir 18 at a steady rate. The water and sludge are drawn from the weir 18 through a flexible conduit 22 by a suction pump 23 (FIG. 7) and are brought to a location remote from the spray booth and reservoir 18 where they are processed for recycling, disposal, etc.

As illustrated, the weir 18 is adapted to be supported by a slide carrier 24 that is mounted for movement vertically along the track 12. Best seen in FIG. 5, the weir 18 is removably secured to the slide carrier 24 by means of slots 26 having a standard pattern that overfits bolts 28 to provide a quick method of attaching different-sized weirs 18 to the slide carrier 24. Accordingly, the flow rate through the gravity feed means 10 may be varied as desired by securing an appropriately-sized weir 18 to the slide carrier 24. Typically, the lip 18a of the weir 18 should be maintained approximately 1 inch below the surface of the water 20. This provides a flow rate of approximately 35 gallons of water per minute for each foot of weir length. The top edge of the weir is in the shape of a triangle so that all of the water flowing across the top edge travels through substantially equal distances to the outflow pipe or conduit 22 at the bottom of the weir. Differences in velocity of water flow across the top edge would cause a vortex to form and the vortex will suck air and disrupt the flow. Thus, the triangular shape for the weir tends to equalize the flow rate at the inlet 22a of the conduit 22 between water flowing over adjacent links of the lip 18a and to prevent the formation of a vortex.

Figure 6:
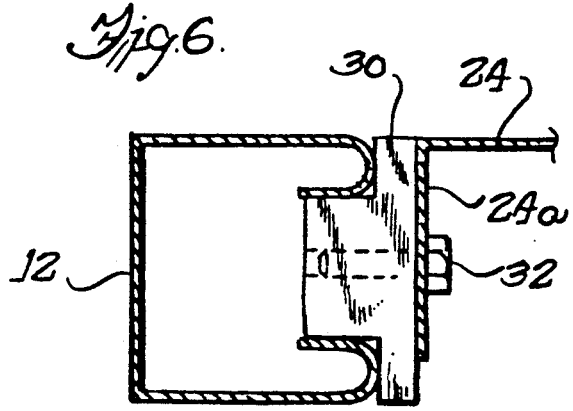
FIG. 6 is an enlarged cross-sectional view taken substantially along line 6—6 of FIG. 5 of the track along which the inlet moves.

To facilitate smooth movement of the slide carrier 24 along the track 12, nylon bearing blocks 13 are secured to the vertically-extending sides 24a of the carrier 24 by bolts 32. As best seen in FIG. 6, the bearing blocks have a T-shaped cross-section that snugly interfits within the track 12, and serves to cut through any sludge buildup in the track 12, thus ensuring smooth movement of the slide carrier 24. Additionally, the nylon from which the bearing blocks 30 are made is resistant to the chemicals normally encountered in the water 20.

To raise and lower the slide carrier 24 (and, consequently, the weir 18) fluid cylinder-piston means, generally indicated by 34, is supported on a mounting plate 36 integral with the upper portion of the track 12 above the surface of the water. The cylinder-piston means 34 is operatively connected to the slide carrier 24 and, as illustrated, includes a pneumatic cylinder 38 (seen in FIG. 2, where it is partially obscured by the track 12) having a piston rod 40 with a clevis 42 on the end thereof secured to a bracket 44 bolted to the slide carrier 24. Compressed air for actuating the pneumatic cylinder 38 is provided through tubing 43. Movement of the piston rod 40 is damped by a hydraulic cylinder or dash pot 46 having its piston rod 48 connected in parallel to piston rod 40 of the pneumatic cylinder by a bracket 50, hydraulic fluid being directed to the opposite sides of an internal piston associated with dash pot 46 through an external conduit 52.

In accordance with the invention, means is provided for actuating the pneumatic cylinder 38 to raise or lower the weir 18 in response to changing water levels in the reservoir 16. To this end, an environmentally protected liquid level sensor, generally designated by 54, is associated with the weir 18 to detect changing water levels with respect thereto. As opposed to directly measuring the water level of the contaminant-laden water in the reservoir 16, which could coat the sensor 54 and make it inoperative, the sensor 54 measures the liquid level of the environmentally clean test liquid having a level that corresponds to the water level in the reservoir 16.

As seen in FIGS. 3 and 4, the liquid level sensor 54 includes a probe 56 having an opto-electronic sensor 58 which may be, e.g., an infrared sensor. Alternatively, the sensor 58 may be an ultrasonic device. The sensor 58 is preferably of the type manufactured by Genleco, Inc. of Dallas, Tex., and is designated as a "PSF-502" polysulfone remote probe. Such a probe 56 utilizes light reflection and refraction to activate or deactivate a solid state switching circuit, seen in FIG. 1 and designated by 60, to raise or lower the weir 18. The sensor element 58 produces a beam of light and, if the probe in a gaseous atmosphere, the light is reflected back into the element 58 to the light-sensing circuit 60, which registers the presence of light. When the probe is subjected to a liquid environment, the light is refracted out into the liquid and the absence of light is registered by the light-sensing circuit 60. The presence or absence of light actuates the switching circuit 60 to appropriately raise or lower the weir 18. However, if the sensor element 58 were to become coated with contaminants during use, it could no longer detect the absence of a liquid environment.

Accordingly, means is provided so that the sensor element 58 senses the level of a clean liquid that will not detrimentally coat the sensor element 58, the clean liquid being maintained at the level that corresponds to the level of the water level in the reservoir 16. To this end, the sensor element 58 extends into a housing 62 having a cap 62a secured to a central tubing section 62b which is closed at its lower end by a flexible diaphragm 64 to maintain a fixed volume of a clean liquid 66, such as water or oil, within the housing 62. The housing 62 is vented to the atmosphere by a length of tubing 68 received in a threaded aperture 70 in the cap 62a so that, when the probe is disposed in the water 20, the pressure inside the housing 62 is the same as that outside, resulting in the level or top surface 66a (FIG. 4) of the test liquid 66 interior the housing being substantially equal to the water level 20a of the reservoir 16. Because the diaphragm 64 floats in the water 20, the clean liquid level 66a will always follow and be at the level 20a of the occluded water 20. The preferred liquid 66 is a light, clear oil such as mineral oil which will not evaporate as readily as would water.

The housing 62 is mounted to the weir 18 so that the position of the sensor element 58 is vertically adjustable with respect to the weir lip 18a. As illustrated, the sensor element 58 is movable by means of a threaded set screw 72 rotatably captured by a bracket 74 secured to the weir 18. A traveler block 76 movable along the threaded portion of the set screw shaft is connected to the central tube portion 62b of the housing 62 by screws 78. Accordingly, the height of the sensor 58 relative to the lip 18a of the weir 18 (and, consequently, the elevation of the weir lip 18a with respect to the surface of the water 20) may be adjusted by manipulation of the set screw 72.

To prevent localized wave action or other turbulence in the water 20 from causing the sensor 58 to give false readings, the lower portion of the central housing tube 62b and the diaphragm 64 are shielded by a tubular sheath member 80. The sheath 80 is secured to the central tube 62b by a screw 82 and includes air relief apertures 84 that vent trapped air from the interior of the sheath 80 and permit the diaphragm 64 to distend or constrict in response to the changing level of the water 20 with respect to the probe 56, Thus, local waves and turbulence that would otherwise act on the diaphragm 64 to affect the level of the liquid 66 within the probe 56 are dampened by the sheath 80 so that the sensor 58 detects average level of the water 20 in the reservoir 16.

To appropriately move the weir 18 in response to the signals generated by the sensor element 58, such signals are fed through a conductive cable 86 to the solid-state controller 60 (FIG. 1) which selectively directs compressed air to alternate sides of the pneumatic cylinder 38 through the tubing 43. The controller may be, e.g., of the type manufactured by Genelco, Inc., and designated as a "Levelite 510" controller.

Figure 7:
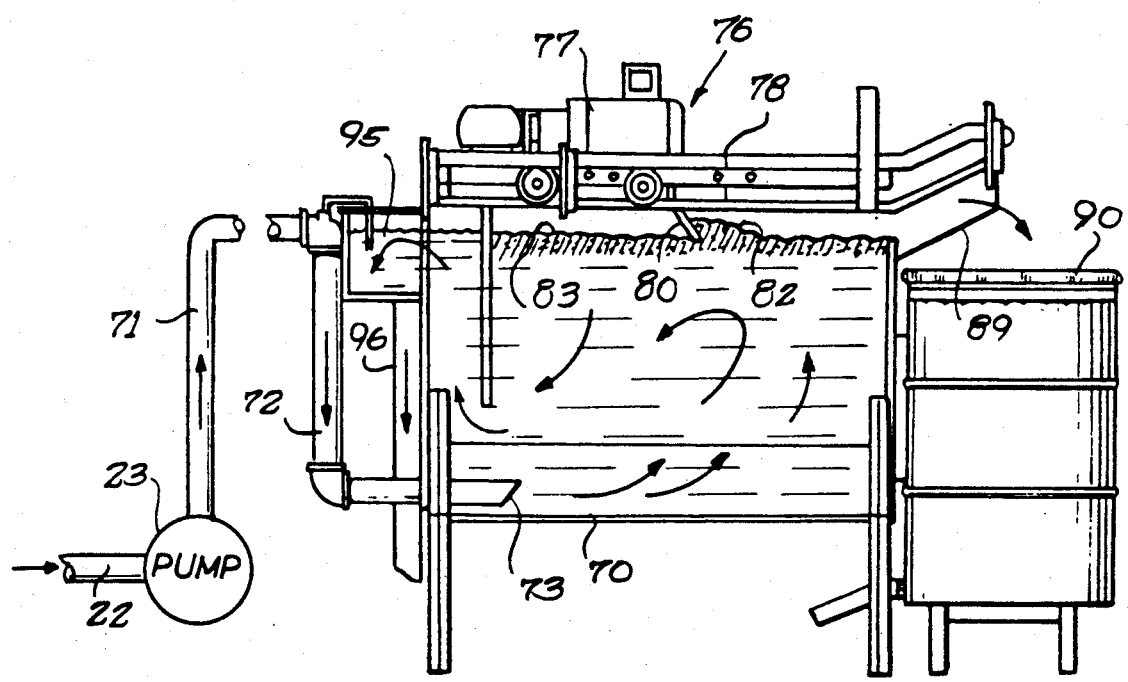
FIG. 7 is a diagrammatic view of a skimmer tank and skimmer blade for removing floating sludge.

A skimming apparatus, such as shown in U.S. Pat. No. 4,484.513, and is illustrated in FIG. 7 includes a skimmer tank 70 into which is pumped the water flowing from the flexible conduit 22 which is connected to the pump 23 for pumping over the lines 71 and 72 into a discharge end 73 of the pipe 72 for flowing in the general pattern shown in FIG. 7 within the tank 70. A skimming apparatus 76 comprises a motor-driven carriage 77 mounted on tracks 78 for travel across the top of the tank 70 with a skimming blade 80 being mounted on the carriage for skimming sludge 82 from the top surface 83 of the occluded water in the tank 70. The sludge 82 is skimmed by the blade 80 upwardly across an inclined ramp 89 to drop into a collecting mean such as a barrel 90. The water is returned from the tank 70 through an upper forward compartment 95 having a return pipe 96 which allows the water to be returned to the spray booth operation for reuse. It is particularly desirable in automatic systems in which the sludge removal carriage 77 is automatically cycled at periodic intervals to move the skimmer blade 80 across the top surface of occluded water to maintain the water level in the skimmer tank 70 at a predetermined height, for example, within a one-eighth to one-fourth of an inch water level variation so that the skimmer blade is always removing sludge from the top layer of water with a light skimming action across the top of the water in the tank 70. The adjustable weir 18 is particularly suited to assuring that there is a continual, even flow of water into the tank 70, for example, at about 35 gallons per minute whenever the system is in operation, and particularly, at startup when the water level in the main spray booth tank 16 is lowered substantially either by filling the pipes if they are empty or by placing water into the spray washers and by flowing water down the baffle blades which are coated with water to catch paint spray particles. Thus, an even flow of water across the weir maintains a more constant water level in the skimming tank 70.

A brief review of the operation of the illustrated invention will now be given. It will be understood that it is preferred that upon startup and for a continuous time of operation thereafter that there be sufficient water always in the skimmer tank 70 that the skimmer blade 80 be effective to reach the floating sludge 82 and to push the floating sludge up the ramp 89 and into the barrel 90.

When the water system is shut down and the water 20 in the water reservoir 16 is at its highest level, the weir lip 18a will be positioned above the surface of the water 20 and the probe 56 is moved along the set screw 72 so that sensor element 58 is located 1 inch above the weir lip 18a. At this time, the level of the liquid 66 in the probe 56 will be such that the sensor element 58 is suspended in a gaseous atmosphere that causes the light emitted by the probe to be reflected back into the element 58. When the light-sensing circuit is activated just prior to the startup of the spray booth, the circuit 60 will register the presence of light and cause compressed air to be directed through the tubing 43 to the pneumatic cylinder 38 to lower the weir 18 until the water level in the reservoir is such to cause the liquid 66 in the probe 56 to touch the sensor element 58, at which time the weir lip 18a will be 1 inch below the surface of the water 20, causing the light emitted by the probe 56 to be reflected out into the liquid 66. The circuit 60 will then register the absence of light and will cease to direct compressed air to the cylinder 38, thus fixing the position of the weir lip 18a with respect to the level of water 20 in the reservoir 16. In a similar manner, the sensor element 54 will detect subsequent changes in the water level and appropriately signal the circuit 60 to maintain the weir lip 18a at its desired level. Also, if the water level rises in the holding tank the sensor senses this and raises the weir 18 to keep the weir lip 18a at about one inch below the top surface 20a of the occluded water. Thus, the weir 18 is raised and lowered to maintain the weir at the desired skimming level and to maintain an even and more constant flow of water through the weir.

The liquid level sensor for occluded liquid such as water containing sludge may be used with devices other than a weir. For example, the water level sensor, herein disclosed, may be connected to a water inlet valve to open the valve to admit water into the reservoir to make up water that has been evaporated or otherwise lost from the water reservoir. When the water level is raised to the proper level, the liquid level sensor will detect the new raised level and send a signal to close the water inlet valve so that the make-up water flow into the reservoir is stopped.

From the foregoing it can be seen that an improved device for reliably adjusting the height of an inlet of a gravity feed device has been provided. While the invention has been described in terms of a preferred embodiment, there is no intent to limit the invention to the same. On the contrary, it is intended to cover all equivalents and modifications within the scope of the appended claims.

What is claimed is:

1. In a system for accumulating and removing floating sludge which is sticky and would coat a float from the upper surface of a body of liquid, said system comprising:
   a paint spray booth having a water wash means for spraying articles with a liquid and for trapping particles of paint,
   a tank for receiving the liquid and trapped paint particles from the water wash means and for holding the body of liquid with floating paint sludge on the liquid,
   a vertically adjustable means including a weir means disposed in said body of liquid having a liquid level and vertically movable upwardly when the liquid level raises and movable downwardly as the liquid level lowers to maintain a substantially uniform skimming flow of the paint sludge from the upper surface of the body of liquid,
   the weir means including a downwardly-extending wall having an upper lip which skims a film of liquid and floating material for flow downwardly past the wall, the weir means having a lower outlet for the skimmed liquid and material flowing downwardly,
   conduit means connected to the outlet of the weir means to withdraw sludge and liquid and for conveying the liquid and sludge from the weir means,
   pump means connected to the outlet of the weir means for producing a suction for causing the skimming of liquid and floating material into said weir means and the passage of the liquid and floating sludge through the conduit means,
   recirculating means for recirculation of the liquid between the tank means and the water wash means,
   means including a sensing means for sensing a condition related to the depth of said lip of said weir means in said body of liquid without the sensing means becoming coated by the sludge means, and
   actuator means controlled by said sensing means to shift said vertically adjustable means and said lip of said weir means upwardly and downwardly as the liquid level raises and lowers, respectively to maintain a uniform flow of liquid and sludge across the lip of said weir means with changes in liquid level in the tank, said sensing means operating the actuator means to maintain the upper lip of the weir means at position below the liquid level to prevent breaking of the pump suction.

2. A system in accordance with claim 1 including a sludge removal tank connected by the conduit means to the weir outlet for receiving sludge and liquid from the weir means, the liquid level in said sludge removal tank being kept at a substantial constant level by a constant flow rate of liquid through said weir means and pump means to said sludge removal tank, sludge removing means for removing sludge from the liquid in the sludge removal tank, and return means for returning liquid from the sludge removal tank to the water wash means.

3. A system in accordance with claim 1 in which the actuator means includes a fluid operated cylinder means connected to the weir means, said sensing means controlling the fluid used in the cylinder means to raise or lower the weir means in accordance with the water level sensed by the sensing means.

4. A method of collecting overspray paint particles and for controlling the flow of liquid and floating sticky paint sludge being skimmed from the surface of the liquid in a tank having a weir with a skimming lip and an outlet connected to a suction pump, said method comprising the steps of:
   wetting the paint overspray particles with a liquid and collecting the wetted paint particles and the liquid in a tank having a body of liquid with an upper surface level and having floating paint sludge on the upper surface of the body of liquid for removal from the tank,
   skimming paint sludge and upper surface liquid from the body of liquid through the weir,
   sensing the location of the upper surface level of the body of water without allowing the sticky paint sludge to adhere to the sensing means,
   positioning a lip of a skimming weir just below the surface level of the liquid in the tank to regulate the amount of liquid flow over the lip and for skimming sludge with the surface flow of liquid into the weir,
   shifting the weir lip upwardly as the liquid level raises in the tank to maintain the lip just below the surface level to continue skimming of paint sludge and liquid flow as the liquid level raises,
   shifting the weir lip downwardly as the liquid level lowers in the tank to maintain the weir lip just below the surface level of the body of liquid to continue skimming of paint sludge and liquid flow as the liquid level lowers,
   sucking the liquid and paint sludge from through the weir at a substantially constant flow rate and maintaining the suction force of the pump by shifting the weir lip vertically to prevent the weir lip being above the upper surface level,
   conveying the liquid and paint sludge from the weir to a means for removing the paint sludge from the liquid, and
   returning the liquid after separation from the paint sludge for reuse for wetting paint particles.

5. A method in accordance with claim 4 including the further step of:
   placing the liquid and sludge conveyed from the weir in a sludge removal tank, and skimming the sludge from the surface of the liquid in sludge removal tank.

6. In a system for accumulating and removing floating paint sludge which is sticky and would coat a float from the upper surface of a body of liquid, said system comprising:
   a paint spray booth having a water wash means for spraying articles with a liquid and for trapping particles of paint,
   a tank for receiving the liquid and trapped paint particles from the water wash means and for holding a body of liquid with floating paint sludge on the liquid, a vertically adjustable means including a basket-type weir means disposed in said body of liquid having a liquid level and vertically movable upwardly when the liquid level raises and movable downwardly as the liquid level lowers to maintain a substantially uniform skimming flow of the paint sludge from the upper surface of the body of liquid, said basket-type weir means having a plurality of downwardly extending walls forming an internal chamber, upper lips on the walls across which liquid and floating material float are pulled downwardly into the internal chamber of the basket-type weir means by a suction force, a lower outlet in the basket-type weir means through which the skimmed liquid and sludge are drawn, conduit means connected to the outlet of the basket-type weir means to withdraw sludge and liquid and for conveying the liquid and sludge from the weir means, suction means connected to outlet of the weir means for producing suction for causing the skimming of liquid and floating material into said weir means, recirculating means for recirculation of the liquid between the tank means and the water wash means, means including a sensing means for sensing a condition related to the depth of said lip of said weir means in said body of liquid without the sensing means becoming coated by the sludge means, and actuator means controlled by said sensing means to shift said vertically adjustable means and said lip of said weir means upwardly and downwardly as the liquid level raises and lowers, respectively to maintain a uniform flow of liquid and sludge across the lip of said weir means with changes in liquid level in the tank and to maintain the internal chamber of the basket-type weir means substantially filled with liquid.

* * * * *